(12) United States Patent
Yang et al.

(10) Patent No.: US 8,242,783 B2
(45) Date of Patent: *Aug. 14, 2012

(54) IONIZATION VACUUM GAUGE

(75) Inventors: Yuan-Chao Yang, Beijing (CN); Jie Tang, Beijing (CN); Li Qian, Beijing (CN); Pi-Jin Chen, Beijing (CN); Liang Liu, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/794,362

(22) Filed: Jun. 4, 2010

(65) Prior Publication Data

US 2010/0237874 A1 Sep. 23, 2010

Related U.S. Application Data

(63) Continuation of application No. 11/967,116, filed on Dec. 29, 2007, now Pat. No. 7,755,363.

(30) Foreign Application Priority Data

Mar. 16, 2007 (CN) .......................... 2007 1 0073541

(51) Int. Cl.
*G01L 21/30* (2006.01)
(52) U.S. Cl. .................. 324/460; 324/459; 324/461
(58) Field of Classification Search .................. 324/460
See application file for complete search history.

(56) References Cited

U.S. PATENT DOCUMENTS

| 3,254,256 | A | * | 5/1966 | Melling et al. ............. 313/359.1 |
| 3,496,399 | A | * | 2/1970 | Buckingham et al. ............ 313/7 |
| 3,891,882 | A | * | 6/1975 | Barraco ............................ 313/7 |
| 5,584,740 | A | * | 12/1996 | Hsu et al. ........................ 445/49 |
| 5,973,444 | A | * | 10/1999 | Xu et al. ....................... 313/309 |
| 6,566,884 | B2 | | 5/2003 | Rutherford et al. |
| 7,049,823 | B2 | | 5/2006 | Correale |
| 7,129,708 | B1 | | 10/2006 | Liu et al. |
| 7,728,504 | B2 | | 6/2010 | Du et al. |
| 7,741,852 | B2 | * | 6/2010 | Watanabe et al. ............. 324/462 |
| 7,755,363 | B2 | * | 7/2010 | Yang et al. ................... 324/460 |
| 7,884,324 | B2 | * | 2/2011 | Blick et al. .................... 250/310 |
| 2008/0012467 | A1 | * | 1/2008 | Negishi ........................ 313/495 |

FOREIGN PATENT DOCUMENTS

| CN | 1670886 A | 9/2005 |
| CN | 1728327 A | 2/2006 |
| JP | S56-11332 | 2/1981 |
| JP | H07-181095 | 7/1995 |
| JP | 2005-62176 | 3/2005 |
| JP | 2006-329880 | 12/2006 |
| JP | 2006-343305 | 12/2006 |
| JP | 2007-24849 | 2/2007 |

(Continued)

*Primary Examiner* — Thomas Valone
(74) *Attorney, Agent, or Firm* — Altis Law Group, Inc.

(57) ABSTRACT

An ionization vacuum gauge includes a cathode electrode, a gate electrode, and an ion collector. The cathode electrode includes a base and a field emission film disposed thereon. The gate electrode is disposed adjacent to the cathode electrode with a distance therebetween. The ion collector is disposed adjacent to the gate electrode with a distance therebetween. The field emission film of the cathode electrode includes carbon nanotubes, a low-melting-point glass, and conductive particles.

18 Claims, 2 Drawing Sheets

| | FOREIGN PATENT DOCUMENTS | |
|---|---|---|
| JP | 2007-33422 | 2/2007 |
| KR | 10-0507607 B1 | 8/2005 |
| TW | I260032 | 8/2006 |
| WO | WO2006094687 | 9/2006 |
| WO | PCT/JP2006/3096132 | * 11/2006 |

* cited by examiner

US 8,242,783 B2

IONIZATION VACUUM GAUGE

CROSS-REFERENCE TO RELATED APPLICATIONS

This application is a continuation of U.S. patent application Ser. No. 11/967,116, filed on Dec. 29, 2007, entitled, "IONIZATION VACUUM GAUGE".

BACKGROUND

1. Technical Field

The present invention relates to vacuum gauges and, particularly, to an ionization vacuum gauge.

2. Description of Related Art

Ionization vacuum gauges have been used for several years. The conventional ionization vacuum gauge includes a hot filament, an anode electrode surrounding the hot filament, and an ion collector surrounding the anode electrode. The anode electrode and the ion collector are coaxial relative to the hot filament. In operation, electrons emit from the hot filament, travel toward and through the anode electrode and eventually are collected by the anode electrode. As the electrons travel, they collide with the molecules and atoms of gas and produce ions, and eventually the ions are collected by the ion collector. The pressure of the vacuum system can be calculated by the formula $P=(1/k)(I_{ion}/I_{electron})$, wherein k is a constant with the unit of 1/torr and is characteristic of a particular gauge geometry and electrical parameters, $I_{ion}$ is a current of the ion collector, and $I_{electron}$ is a current of the anode electrode.

However, the hot filament of the conventional ionization vacuum gauge is generally a hot tungsten filament. In operation, the tungsten filament requires several watts of electrical power to operate, and dissipates a great deal of heat and light in the vacuum system, and consequently the power consumption of the conventional ionization vacuum gauge is high. Furthermore, the high temperature of the hot tungsten filament can cause evaporation, and thus is not conducive to the vacuum system.

What is needed, therefore, is an ionization vacuum gauge with low power consumption and low evaporation effect.

BRIEF DESCRIPTION OF THE DRAWINGS

Many aspects of the present ionization vacuum gauge can be better understood with reference to the following drawings. The components in the drawings are not necessarily to scale, the emphasis instead being placed upon clearly illustrating the principles of the present ionization vacuum gauge.

Figure 1:
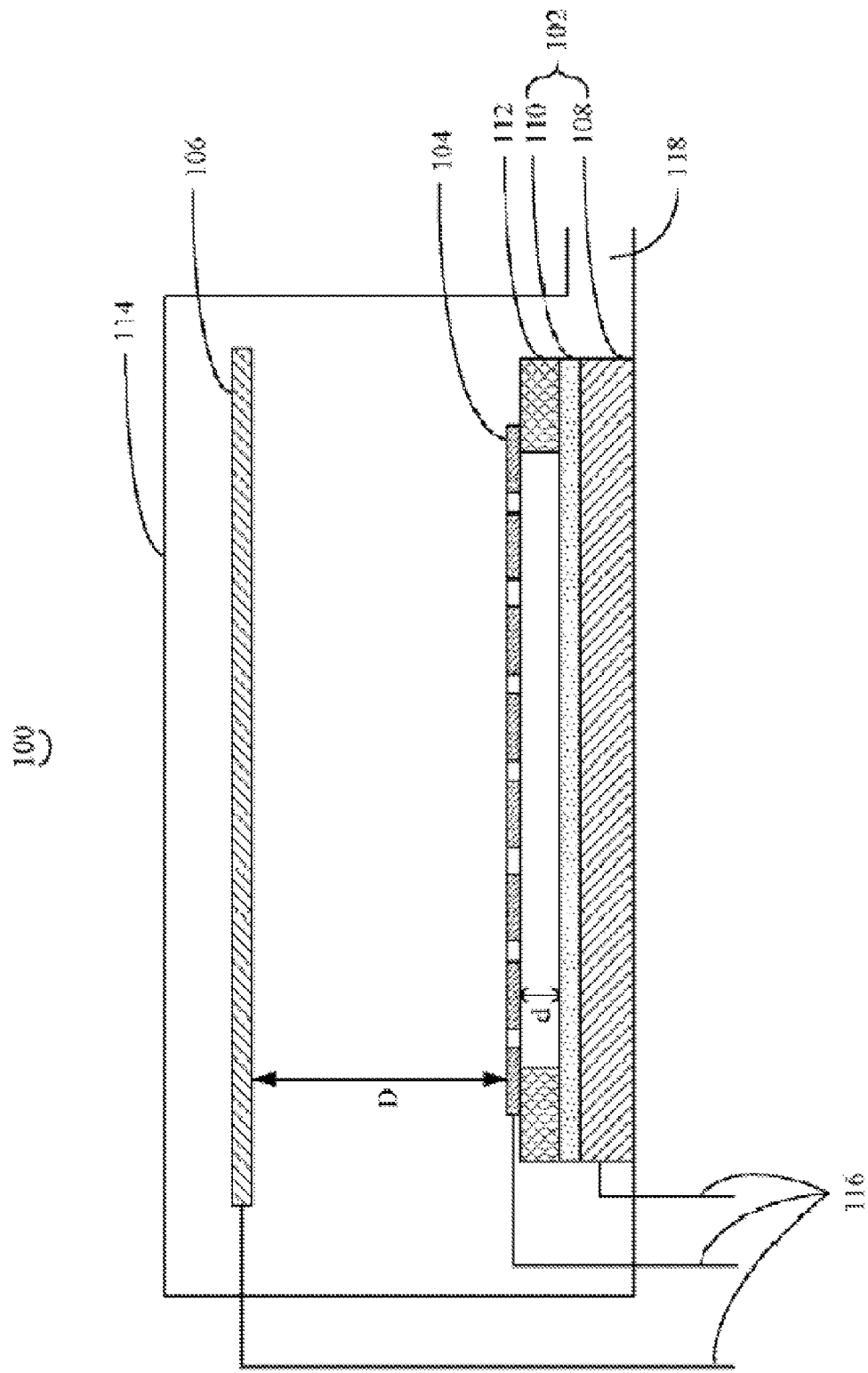
FIG. 1 is a schematic, cross-sectional view of the ionization vacuum gauge according to a present embodiment.

Corresponding reference characters indicate corresponding parts throughout the several views. The exemplifications set out herein illustrate at least one preferred embodiment of the present ionization vacuum gauge, in at least one form, and such exemplifications are not to be construed as limiting the scope of the invention in any manner.

DETAILED DESCRIPTION OF EXEMPLARY EMBODIMENTS

Reference will now be made to the drawings to describe, in detail, embodiments of the present ionization vacuum gauge.

Referring to FIG. 1, an ionization vacuum gauge 100 includes a cathode electrode 102, a gate electrode 104, and an ion collector 106. The gate electrode 104 is disposed adjacent to the cathode electrode 102 with a distance therebetween. The ion collector 106 is disposed adjacent to the gate electrode 104 with a distance therebetween. The cathode electrode 102 includes a base 108 and a field emission film 110 disposed thereon facing the ion collector 106.

The gate electrode 104 and the ion collector 106 are made of a conductive metal, such as gold (Au), copper (Cu), and so on. The ion collector 106 is a conductive metal planar plate. The gate electrode 104 has an apertured structure, such as a metallic ring, a metal-enclosed aperture, or a metallic net. The cathode electrode 102 and the gate electrode 104 are spaced by a plurality of insulative spacers 112, such as insulative ceramic. The distance between the cathode electrode 102 and the gate electrode 104 is named "d" and is less than or equal to 200 micrometers and greater than 0 micrometers. The distance between the gate electrode 104 and the ion collector 106 is named "D" and is in an approximate range from 0.5 to 2 millimeters. Beneficially, "d" is 200 micrometers and "D" is 1 millimeter.

The base 108 of the cathode electrode 102 is made of transparent conductive indium tin oxide glass. The field emission film 110 is, usefully, composed, initially, of carbon nanotubes, low-melting-point glass powders, conductive particles, and an organic carrier/binder. The weight percentages of the foregoing ingredients are respectively: about 5%~15% carbon nanotubes, about 10%~20% conductive particles, about 5% low-melting-point glass powders, and about 60%~80% organic carrier/binder, this latter component being evaporated and/or burned off in a drying step, leaving the other three ingredients in the final film composition. The carbon nanotubes can be obtained by a conventional method such as chemical vapor deposition, arc discharging, or laser ablation. Rather suitably, the carbon nanotubes are obtained by chemical vapor deposition. Lengths of the carbon nanotubes are, advantageously, approximately in a range from 5 micrometers to 15 micrometers. This range is preferred because carbon nanotubes less than 5 μm in length tend to be weak electron emitters and carbon nanotubes greater than 15 μm in length are, often, easily broken.

The organic carrier/binder is composed of terpineol, acting as a solvent; dibutyl phthalate, acting as a plasticizer; and ethyl cellulose, acting as a stabilizer. The low-melting-point glass melts at an approximate temperature from 400° C. to 500° C. The function of the low-melting-point glass is to attach carbon nanotube films firmly to the base 108. The conductive particles can, usefully, be silver and/or indium tin oxide (ITO). The conductive particles help ensure, to at least a certain degree, that the carbon nanotubes are electrically connected to the base 108.

A process for forming the cathode electrode 102 is illustrated as per the following steps: (a) providing and uniformly mixing the carbon nanotubes, low-melting-point glass powders, conductive particles, and an organic carrier/binder in a certain ratio to form a composite slurry; (b) coating the composite slurry on a surface of the base 108; and (c) drying and sintering the composite slurry to form the field emission film 110 on the base 108.

In step (b), the composite slurry is beneficially provided onto the base 108 by a silk-screen printing process. In step (c), drying the composite slurry is performed to remove (e.g., evaporate and/or burn off) the organic carrier/binder, and sintering the composite slurry to melt the low-melting-point glass powders for firmly attaching the carbon nanotubes to the base 108. After step (c), the field emission film 110 can, opportunely, further be scrubbed with rubber to expose end portions of carbon nanotubes, thus enhancing the electron emission capability thereof.

Alternatively, the field emission film 110 can be made essentially of carbon nanotubes, which are deposited on the base 108 by a conventional method, i.e., carbon nanotubes are formed directly on the base 108.

The ionization vacuum gauge 100 further includes an enclosure 114 and three electrode down-leads 116. The enclosure 114 is part of a vacuum system. The aforementioned cathode electrode 102, gate electrode 104, and ion collector 106 are all disposed in the enclosure 114. The enclosure 114 is connected to a chamber (not shown) whose pressure is measured. First ends of the electrode down-leads 116 are electrically connected to the cathode electrode 102, the gate electrode 104, and the ion collector 106, respectively, and second ends of the electrode down-leads 116 are extended out of the enclosure 114. It is to be understood that the vacuum system incorporates one or more known evacuation mechanisms (not shown), as needed to achieve the desired level of vacuum.

In the operation of the ionization vacuum gauge 100, voltage is applied to the cathode electrode 102 and the gate electrode 104 to cause electron emission. After emission, electrons are drawn and accelerated toward the gate electrode 104 by the electric potential, then tend to pass through the gate electrode 104 because of their inertia and the apertured structure of the gate electrode 104. The ion collector 106 is supplied with a negative electric potential and thus decelerates the electrons. Therefore, before arriving at the ion collector 106, electrons are drawn back to the gate electrode 104, and an electric current ($I_{electron}$) is formed. During travel, electrons collide with gas molecules, ionize some of gas molecules, and produce ions. Typically, the ions are in the form of positive ions and are collected by the ion collector 106, and, thus, an ion current ($I_{ion}$) is formed. A ratio of $I_{ion}$ to $I_{electron}$ is proportional to pressure in the ionization vacuum gauge 100, within a certain pressure range, covering the primary range of interest for most vacuum devices. Therefore, the pressure in the ionization vacuum gauge 100 and, by extension, the vacuum device (not shown), to which it is attached, can be measured according to the above relationship. The measurement range of the present ionization vacuum gauge 100 is in a range from $10^{-4}$ pascals (Pa) to $10^1$ Pa in a nitrogen atmosphere. The measurement range of the present ionization vacuum gauge 100 is in a range from $10^{-3}$ Pa to $10^2$ Pa in a helium atmosphere.

Figure 2:
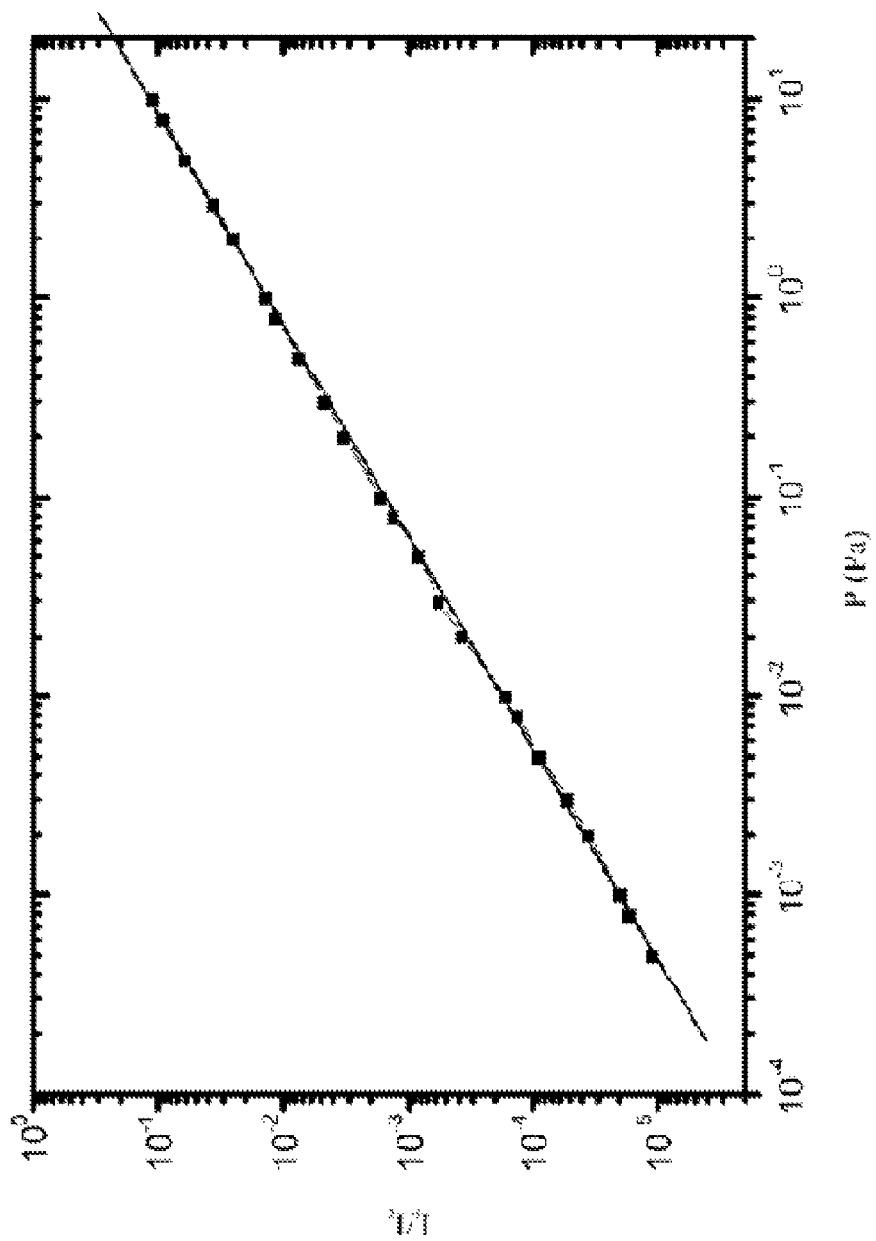
FIG. 2 is a pressure graph displaying a ratio of ion current to electron current, according to the present embodiment.

Referring to FIG. 2, the ratio of $I_{ion}$ to $I_{electron}$ of the ionization vacuum gauge 100, according to the present embodiment, is perfectly proportional to the pressure in a range from $10^{-4}$ Pa to $10^1$ Pa, as can be seen in FIG. 2.

Compared with the conventional ionization vacuum gauge, the cathode electrode of the present ionization vacuum gauge includes the carbon nanotubes as the emission source. The electrical power supply to the present ionization vacuum gauge is able to be lower, and electrons are emitted from the carbon nanotubes of the cathode electrode without dissipating heat and light and without promoting evaporation. Thus, the present ionization vacuum gauge is suitable for use in a middle vacuum system.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. An ionization vacuum gauge, comprising:
   a cathode electrode comprising a base and a field emission film disposed thereon;
   a gate electrode disposed adjacent to the cathode electrode with a distance therebetween; and
   an ion collector disposed adjacent to the gate electrode with a distance therebetween;
   wherein the field emission film of the cathode electrode comprises carbon nanotubes, a low-melting-point glass, and conductive particles, and the cathode electrode and the gate electrode are insulated from each other by a plurality of insulative spacers, and the distance between the cathode electrode and the gate electrode is less than or equal to 200 micrometers.

2. The ionization vacuum gauge as claimed in claim 1, wherein the conductive particles comprise indium tin oxide or silver particles.

3. The ionization vacuum gauge as claimed in claim 1, wherein lengths of the carbon nanotubes are in a range from about 5 micrometers to about 15 micrometers.

4. The ionization vacuum gauge as claimed in claim 1, wherein the ion collector is a conductive metal planar plate.

5. The ionization vacuum gauge as claimed in claim 1, wherein the distance between the gate electrode and the ion collector is in a range from about 0.5 millimeters to about 2 millimeters.

6. The ionization vacuum gauge as claimed in claim 1, wherein the gate electrode is an apertured structure.

7. The ionization vacuum gauge as claimed in claim 6, wherein the apertured structure comprises at least one of metal rings, enclosed metal apertures, and metal nets.

8. The ionization vacuum gauge as claimed in claim 1, further comprising an enclosure and three electrode down-leads.

9. The ionization vacuum gauge as claimed in claim 8, wherein the cathode electrode, the gate electrode, and the ion collector, are located in the enclosure.

10. The ionization vacuum gauge as claimed in claim 9, wherein the three electrode down-leads have first ends electrically connected to the cathode electrode, the gate electrode, and the ion collector respectively and second ends extending out of the enclosure.

11. An ionization vacuum gauge, comprising:
    a cathode electrode comprising a field emission film;
    a gate electrode disposed adjacent to the cathode electrode with a distance therebetween; and
    an ion collector disposed adjacent to the gate electrode with a distance therebetween;
    wherein the field emission film comprises carbon nanotubes, and lengths of the carbon nanotubes are in a range from about 5 micrometers to about 15 micrometers.

12. An ionization vacuum gauge, comprising:
    a cathode electrode comprising a base and a field emission film disposed thereon;
    a gate electrode disposed adjacent to the cathode electrode with a distance therebetween; and
    an ion collector disposed adjacent to the gate electrode with a distance therebetween;
    wherein the field emission film of the cathode electrode comprises carbon nanotubes, a low-melting-point glass, and conductive particles; and the distance between the gate electrode and the ion collector is in a range from about 0.5 millimeters to about 2 millimeters.

13. The ionization vacuum gauge as claimed in claim 12, wherein the carbon nanotubes of the field emission film are located directly on the base.

14. The ionization vacuum gauge as claimed in claim 13, wherein the base of the cathode electrode comprises indium tin oxide glass.

15. The ionization vacuum gauge as claimed in claim 13, wherein the base of the cathode electrode is transparent and conductive.

16. The ionization vacuum gauge as claimed in claim 12, wherein the gate electrode is a metallic net.

17. The ionization vacuum gauge as claimed in claim 12, wherein lengths of the carbon nanotubes are in a range from about 5 micrometers to about 15 micrometers.

18. The ionization vacuum gauge as claimed in claim 12, wherein the ion collector is a conductive metal planar plate.

* * * * *